(12) United States Patent
Wang

(10) Patent No.: US 12,132,640 B2
(45) Date of Patent: Oct. 29, 2024

(54) METHOD FOR MONITORING RUNNING STATE OF PEER, APPARATUS, AND STORAGE MEDIUM

(71) Applicant: HUAWEI TECHNOLOGIES CO., LTD., Guangdong (CN)

(72) Inventor: Fengyi Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 358 days.

(21) Appl. No.: 17/736,462

(22) Filed: May 4, 2022

(65) Prior Publication Data

US 2022/0263746 A1 Aug. 18, 2022

Related U.S. Application Data

(63) Continuation of application No. PCT/CN2020/106484, filed on Aug. 1, 2020.

(30) Foreign Application Priority Data

Nov. 6, 2019 (CN) .......................... 201911078235.1

(51) Int. Cl.
*H04L 45/02* (2022.01)
*H04L 45/745* (2022.01)

(52) U.S. Cl.
CPC ............ *H04L 45/04* (2013.01); *H04L 45/745* (2013.01)

(58) Field of Classification Search
CPC ....... H04L 45/04; H04L 45/745; H04L 45/70; H04L 45/74; H04L 45/02; H04L 45/30; H04L 45/308
See application file for complete search history.

(56) References Cited

U.S. PATENT DOCUMENTS

2006/0164995 A1* 7/2006 Djernaes ............... H04L 45/306
370/238
2006/0171404 A1* 8/2006 Nalawade ............. H04L 45/563
370/428
(Continued)

FOREIGN PATENT DOCUMENTS

CN 101099342 A 1/2008
CN 106161256 A 11/2016
(Continued)

OTHER PUBLICATIONS

Patent Cooperation Treaty (PCT) International Search Report (ISR) English translation for PCT/CN2020/106484; Oct. 16, 2020 (Year: 2020).*

(Continued)

*Primary Examiner* — Benjamin H Elliott, IV
(74) *Attorney, Agent, or Firm* — WOMBLE BOND DICKINSON (US) LLP

(57) ABSTRACT

This application disclose a method for monitoring a running state of a peer, an apparatus, and a storage medium. The method includes: obtaining, by a routing device, address family information of a first peer and address information of the first peer; and sending, by the routing device, a notification message to a server, where the notification message carries the address family information of the first peer and the address information of the first peer, so that the server stores a running state of the first peer based on the address family information of the first peer, the address information of the first peer, and a type of the notification message.

20 Claims, 10 Drawing Sheets

---

Obtain address family information of a first peer and address information of the first peer — 301

Send a notification message to a server, where the notification message carries the address family information of the first peer and the address information of the first peer, so that the server stores a running state of the first peer based on the address family information of the first peer, the address information of the first peer, and a type of the notification message, where the notification message includes an extension header, and the address family information of the first peer is located in the extension header — 302

(56) References Cited

U.S. PATENT DOCUMENTS

| | | | |
|---|---|---|---|
| 2013/0117449 A1* | 5/2013 | Hares | H04L 45/04 709/225 |
| 2017/0134308 A1* | 5/2017 | Zhuang | H04L 41/0853 |
| 2019/0028381 A1* | 1/2019 | Li | H04L 45/04 |
| 2019/0097928 A1* | 3/2019 | Chunduri | H04L 45/036 |
| 2019/0132232 A1* | 5/2019 | Ammireddy | H04L 45/04 |
| 2020/0136940 A1* | 4/2020 | Gandham | H04L 43/0888 |
| 2020/0244582 A1* | 7/2020 | Li | H04L 47/32 |
| 2021/0092052 A1* | 3/2021 | Tantsura | H04L 45/34 |
| 2021/0135982 A1* | 5/2021 | Chaturmohta | H04L 45/28 |
| 2022/0263746 A1* | 8/2022 | Wang | H04L 45/04 |

FOREIGN PATENT DOCUMENTS

| | | |
|---|---|---|
| CN | 108123848 A | 6/2018 |
| CN | 109246008 A | 1/2019 |
| EP | 3163799 A1 | 5/2017 |
| WO | 2018121284 A1 | 7/2018 |

OTHER PUBLICATIONS

Request for Comments (RFC) 8654 "Extended Message Support for BGP"; Bush et al.; Oct. 2019 (Year: 2019).*

Request for Comments (RFC) 8671 "Support for Adj-RIB-Out in the BGP Monitoring Protocol (BMP)"; Evens et al.; Nov. 2019 (Year: 2019).*

T. Evens et al, Support for Adj-RIB-Out in BGP Monitoring Protocol (BMP), draft-evens-grow-bmp-adj-rib-out-01, Global Routing Operations Internet-Draft, Mar. 30, 2017, 12 pages.

T. Evens et al, Support for Adj-RIB-Out in BGP Monitoring Protocol (BMP), draft-ietf-grow-bmp-adj-rib-out-05, Global Routing Operations Internet-Draft, Jun. 7, 2019, 12 pages.

T. Evens et al, Support for Local RIB in BGP Monitoring Protocol (BMP), draft-ietf-grow-bmp-local-rib-02, Global Routing Operations Internet-Draft, Sep. 17, 2018, 16 pages.

Request for Comments: 7854, J. Scudder, Ed et al, BGP Monitoring Protocol (BMP), Internet Engineering Task Force (IETF), Jun. 2016, 27 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
| Version       |
+-+-+-+-+-+-+-+-+-+-+-+-+-+-+-+-+-+-+-+-+-+-+-+-+-+-+-+-+-+-+-+-+
|                         Message Length                        |
+-+-+-+-+-+-+-+-+-+-+-+-+-+-+-+-+-+-+-+-+-+-+-+-+-+-+-+-+-+-+-+-+
| Msg. Type     |
+-+-+-+-+-+-+-+-+
```

```
 0 1 2 3 4 5 6 7
+-+-+-+-+-+-+-+-+
|F|L|A|O| Resv  |
+-+-+-+-+-+-+-+-+
```

METHOD FOR MONITORING RUNNING STATE OF PEER, APPARATUS, AND STORAGE MEDIUM

CROSS-REFERENCE TO RELATED APPLICATIONS

This application is a continuation of International Application No. PCT/CN2020/106484, filed on Aug. 1, 2020, which claims priority to Chinese Patent Application No. 201911078235.1, filed on Nov. 6, 2019. The disclosures of the aforementioned applications are hereby incorporated by reference in their entireties.

TECHNICAL FIELD

This application relates to the field of electronic technologies, and in particular, to a method for monitoring a running state of a peer, an apparatus, and a storage medium.

BACKGROUND

Peer: Routers running the Border Gateway Protocol (BGP) transmit packets to each other. Routers that transmit packets to each other are mutually referred to as peers (Peer).

A network administrator often needs to view BGP routing information on a device. In the conventional technology, the BGP Monitoring Protocol (BMP) is used to monitor a peer state (up/down) of each BGP peer and BGP routing information. When detecting that the running state of the peer changes, the device reports running state change information to a BMP server. The BMP server receives and stores data, and presents the data to a user in a form of a database. In this way, the network administrator can clearly observe the BGP routing information through an interface. The BGP routing information includes received routing information Bases in (RIB-In), sent routing information Bases out (RIB-Out), and locally stored routing information Bases (local-RIB).

Currently, messages reported by the device to the server are marked with only three peer types. The three peer types are respectively Peer Type=0: Global Instance Peer, Peer Type=1: RD Instance Peer, and Peer Type=2: Local Instance Peer. The three peer types merely distinguish types of peers, and do not specify address family information of a reported route (that is, a corresponding peer). Currently, the conventional technology merely distinguishes the peer types. When the device reports a peer up message, the reported message carries information about all address families of a same peer type of the peer, but cannot identify the peer. Because different address family information generally carries different services, this situation cannot provide more accurate information for the administrator. When a peer state of a single peer is peer down, the conventional technology is to report a peer down message once, and then report a peer up message again. This means tends to generate abnormal neighbor flapping information. If the BMP server records the flapping information and performs data analysis, the user may be misled.

SUMMARY

This application provides a method for monitoring a running state of a peer, an apparatus, and a storage medium, where address family information of a corresponding peer is carried in a reported packet, so that state change information of an independent peer is monitored more clearly.

According to a first aspect, an embodiment of this application provides a method for monitoring a running state of a peer. The method includes the following operations: A routing device obtains address family information of a first peer and address information of the first peer; and the routing device sends a notification message to a server, where the notification message carries the address family information of the first peer and the address information of the first peer, so that the server stores a running state of the first peer based on the address family information of the first peer, the address information of the first peer, and a type of the notification message.

In this embodiment of this application, because the address family information of the corresponding peer is placed in the notification message, peer information monitored in this solution can be clearer, and the information is more reliable. In addition, a manner of processing a peer state change of a single address family is normalized, and is more convenient.

Before obtaining the address family information of the first peer and the address information of the first peer, the method further includes the following operation:

The routing device detects that the running state of the first peer changes. That the running state changes may mean that a BGP route changes. For example, a route is newly added, a route is newly deleted, or a route attribute is updated. In an embodiment, that the running state changes may mean that a BGP peer state changes. For example, the peer state is set to peer up; or the peer state is set to peer down. Types of different notification messages correspond to different running states of the peer. Correspondingly, the type of the notification message may be a route monitoring message, a peer up message, or a peer down message. When the type of the notification message is the route monitoring message, the route monitoring message includes changed routing information, and that the server stores a running state of the first peer based on the address family information of the first peer, the address information of the first peer, and a type of the notification message includes: the server stores the changed routing information in association with the address family information of the first peer and the address information of the first peer.

When the type of the notification message is the peer up message, that the server stores a running state of the first peer based on the address family information of the first peer, the address information of the first peer, and a type of the notification message includes: the server stores the peer up running state of the first peer in association with the address family information of the first peer and the address information of the first peer.

When the type of the notification message is the peer down message, that the server stores a running state of the first peer based on the address family information of the first peer, the address information of the first peer, and a type of the notification message includes: the server stores the peer down running state of the first peer in association with the address family information of the first peer and the address information of the first peer.

The routing device may be a router that runs the BMP protocol. The routing device further runs the BGP protocol. The first peer may be a router that runs the BGP protocol.

The notification message may include an extension header, and the address family information of the first peer may be located in the extension header.

Because the address family information is placed in the extension header, the peer information monitored in this solution is clearer, and the information is more reliable.

The extension header may be in a TLV format. Correspondingly, the extension header carries type information type of the extension header, length information length of the extension header, and an address family information field used to carry the address family information of the first peer.

The notification message further includes a first packet header and a second packet header. The first packet header is located in a header of the notification message. Both the second packet header and the extension header are located after the first packet header. The first packet header may be a common packet header common header, and the second packet header may be a per peer packet header per peer header.

In one embodiment, the extension header is located between the first packet header and the second packet header. The extension header is located between the first packet header and the second packet header. This is more compliant with logic of packet parsing. Because the address information of the peer is parsed based on the address family information, parsing efficiency is improved.

In one embodiment, the second packet header includes a flags field, and the flags field includes at least one or more of the following flag bits:

a first flag bit, where the first flag bit is used to identify an address type of the first peer; a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information. Corresponding routing information may be obtained by parsing the flags field.

In another embodiment, the notification message includes a first packet header and a second packet header, the first packet header is located in a header of the notification message, and both the address family information of the first peer and the address information of the first peer are located in the second packet header.

In this embodiment of this application, because the address family information of the corresponding peer is placed in the second packet header, peer information monitored in this solution can be clearer, and the information is more reliable. In addition, a manner of processing a peer state change of a single address family is normalized, and is more convenient.

The address family information of the first peer may be information newly added in the second packet header. In an embodiment, peer type information peer type in the second packet header may be replaced with the address family information of the peer. In other words, the second packet header does not include the peer type information.

The address family information of the first peer includes primary address family information and subsequent address family information. The primary address family information and the subsequent address family information are two independent fields.

Because a packet structure is changed in the foregoing embodiment, to avoid inability of parsing a packet in this solution by using an existing packet parsing method, the first packet header provided in this embodiment of this application includes first version information, where the first version information is different from earlier packet version information. To be specific, the first version information is extended packet version information. In other words, when the second packet header is updated, the packet version information is also updated.

In one embodiment, the second packet header includes a flags field, and the flags field includes at least one or more of the following flag bits:

a first flag bit, where the first flag bit is used to identify an address type of the first peer; a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information.

According to a second aspect, an embodiment of this application provides a method for monitoring a running state of a peer. The method includes the following operations: A routing device obtains an address type of a first peer and address information of the first peer; and the routing device sends a notification message to a server, where the notification message carries the address type of the first peer and the address information of the first peer, so that the server stores a running state of the first peer based on the address type of the first peer, the address information of the first peer, and a type of the notification message.

The notification message includes a first packet header and a second packet header, the first packet header is located in a header of the notification message, and both the address type of the first peer and the address information of the first peer are located in the second packet header; and the second packet header includes a flags field, the flags field includes at least one first flag bit, and the first flag bit is used to identify the address type of the first peer. The address type of the first peer includes IPv4 or IPv6.

In this embodiment of this application, the address type of the peer is obtained, and the address type is encapsulated into the flags field of the second packet header, so that different address types can be distinguished. Therefore, a problem that IPv4 and IPv6 cannot be distinguished in the conventional technology is resolved.

In one embodiment, the flags field further includes one or more of the following flag bits:

a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information.

This embodiment of this application may be further combined with the foregoing embodiments.

Specifically, the method further includes the following operation: The routing device obtains address family information of the first peer.

The address family information of the first peer is located in the second packet header of the notification message. For example, the address family information of the first peer replaces peer type information. In an embodiment, the address family information of the first peer is added to the related second packet header. Correspondingly, the first packet header includes first version information, and the first version information is different from earlier version information.

In an embodiment, the notification message further includes an extension header, and the address family information of the first peer is located in the extension header. The extension header may be in a TLV format. Correspondingly, the extension header carries type information type of the extension header, length information length of the extension header, and an address family information field used to carry the address family information of the first peer.

According to a third aspect, an embodiment of this application provides an apparatus, including one or more processors and one or more memories, where the one or more memories are coupled to the one or more processors, the one or more memories are configured to store computer program code, and the computer program code includes computer instructions; and when the one or more processors execute the computer instructions, the apparatus is enabled to perform the following solution:

when the one or more processors execute the computer instructions, the apparatus is enabled to perform the following operations:
obtaining address family information of a first peer and address information of the first peer; and sending a notification message to a server, where the notification message carries the address family information of the first peer and the address information of the first peer, so that the server stores a running state of the first peer based on the address family information of the first peer, the address information of the first peer, and a type of the notification message.

In this embodiment of this application, because the address family information of the corresponding peer is placed in the notification message, peer information monitored in this solution can be clearer, and the information is more reliable. In addition, a manner of processing a peer state change of a single address family is normalized, and is more convenient.

Before obtaining the address family information of the first peer and the address information of the first peer, the solution further includes the following operation:

The routing device detects that the running state of the first peer changes. That the running state changes may mean that a BGP route changes. For example, a route is newly added, a route is newly deleted, or a route attribute is updated. In an embodiment, that the running state changes may mean that a BGP peer state changes. For example, the peer state is set to peer up; or the peer state is set to peer down.

Correspondingly, the type of the notification message may be a route monitoring (route monitor) message, a peer up message, or a peer down message. When the type of the notification message is the route monitoring message, the route monitoring message includes changed routing information, and that the server stores a running state of the first peer based on the address family information of the first peer, the address information of the first peer, and a type of the notification message includes: the server stores the changed routing information in association with the address family information of the first peer and the address information of the first peer.

When the type of the notification message is the peer up message, that the server stores a running state of the first peer based on the address family information of the first peer, the address information of the first peer, and a type of the notification message includes: the server stores the peer up running state of the first peer in association with the address family information of the first peer and the address information of the first peer.

When the type of the notification message is the peer down message, that the server stores a running state of the first peer based on the address family information of the first peer, the address information of the first peer, and a type of the notification message includes: the server stores the peer down running state of the first peer in association with the address family information of the first peer and the address information of the first peer.

The routing device may be a router that runs the BMP protocol. The routing device further runs the BGP protocol. The first peer may be a router that runs the BGP protocol.

The notification message may include an extension header, and the address family information of the first peer may be located in the extension header.

Because the address family information is placed in the extension header, the peer information monitored in this solution is clearer, and the information is more reliable.

The extension header may be in a TLV format. Correspondingly, the extension header carries type information type of the extension header, length information length of the extension header, and an address family information field used to carry the address family information of the first peer.

The notification message further includes a first packet header and a second packet header. The first packet header is located in a header of the notification message. Both the second packet header and the extension header are located after the first packet header. The first packet header may be a common packet header common header, and the second packet header may be a per peer packet header per peer header.

In one embodiment, the extension header is located between the first packet header and the second packet header. The extension header is located between the first packet header and the second packet header. This is more compliant with logic of packet parsing. Because the address information of the peer is parsed based on the address family information, parsing efficiency is improved.

In one embodiment, the second packet header includes a flags field, and the flags field includes at least one or more of the following flag bits:
a first flag bit, where the first flag bit is used to identify an address type of the first peer; a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information. Corresponding routing table information may be obtained by parsing the flags field.

In another embodiment, the notification message includes a first packet header and a second packet header, the first packet header is located in a header of the notification message, and both the address family information of the first peer and the address information of the first peer are located in the second packet header.

In this embodiment of this application, because the address family information of the corresponding peer is placed in the second packet header, peer information monitored in this solution can be clearer, and the information is more reliable. In addition, a manner of processing a peer state change of a single address family is normalized, and is more convenient.

The address family information of the first peer may be information newly added in the second packet header. In an embodiment, peer type information peer type in the second packet header may be replaced with the address family information of the peer. In other words, the second packet header does not include the peer type information.

The address family information of the first peer includes primary address family information and subsequent address family information. The primary address family information and the subsequent address family information are two independent fields.

Because a packet structure is changed in the foregoing embodiment, to avoid inability of parsing a packet in this solution by using an existing packet parsing method, the first packet header provided in this embodiment of this application includes first version information, where the first version information is different from earlier packet version information. To be specific, the first version information is extended packet version information. In other words, when the second packet header is updated, the packet version information is also updated.

In one embodiment, the second packet header includes a flags field, and the flags field includes at least one or more of the following flag bits:

a first flag bit, where the first flag bit is used to identify an address type of the first peer; a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information.

According to a fourth aspect, an embodiment of this application provides an apparatus, including one or more processors and one or more memories, where the one or more memories are coupled to the one or more processors, the one or more memories are configured to store computer program code, and the computer program code includes computer instructions; and when the one or more processors execute the computer instructions, the apparatus is enabled to perform the following solution:

when the one or more processors execute the computer instructions, the apparatus is enabled to perform the following operations:

obtaining an address type of a first peer and address information of the first peer; and sending a notification message to a server, where the notification message carries the address type of the first peer and the address information of the first peer, so that the server stores a running state of the first peer based on the address type of the first peer, the address information of the first peer, and a type of the notification message, where the notification message includes a first packet header and a second packet header, the first packet header is located in a header of the notification message, and both the address type of the first peer and the address information of the first peer are located in the second packet header; and the second packet header includes a flags field, the flags field includes at least one first flag bit, and the first flag bit is used to identify the address type of the first peer. The address type of the first peer includes IPv4 or IPv6.

In this embodiment of this application, the address type of the peer is obtained, and the address type is encapsulated into the flags field of the second packet header, so that different address types can be distinguished. Therefore, a problem that IPv4 and IPv6 cannot be distinguished in the conventional technology is resolved.

In one embodiment, the flags field further includes one or more of the following flag bits:

a second flag bit, where the second flag bit is used to identify policy processing information of the first peer; a third flag bit, where the third flag bit is used to identify a quantity of bytes of an AS number of the first peer; a fourth flag bit, where the fourth flag bit is used to identify a type of routing information; and a fifth flag bit, where the fifth flag bit is used to identify integrity of the routing information.

The solution further includes: obtaining address family information of the first peer. The address family information of the first peer is located in the second packet header of the notification message. For example, the address family information of the first peer replaces peer type information. In an embodiment, the address family information of the first peer is added to the related second packet header. Correspondingly, the first packet header includes first version information, and the first version information is different from earlier version information.

In an embodiment, the notification message further includes an extension header, and the address family information of the first peer is located in the extension header. The extension header may be in a TLV format. Correspondingly, the extension header carries type information type of the extension header, length information length of the extension header, and an address family information field used to carry the address family information of the first peer.

According to a fifth aspect, an embodiment of this application further provides a method for monitoring a running state of a peer. The method includes the following operations:

A server receives and parses a notification message, where the notification message carries address family information of a first peer and address information of the first peer; and the server stores a running state of the first peer based on the address family information of the first peer, the address information of the first peer, and a type of the notification message. The server may be a BMP server.

According to a sixth aspect, an embodiment of this application further provides a method for monitoring a running state of a peer. The method includes the following operations:

A server receives and parses a notification message, where the notification message carries an address type of a first peer and address information of the first peer; and the server stores a running state of the first peer based on the address type of the first peer, the address information of the first peer, and a type of the notification message. The server may be a BMP server.

According to a seventh aspect, an embodiment of this application further provides an apparatus, including:

an obtaining module, configured to obtain address family information of a first peer and address information of the first peer; and a sending module, configured to send a notification message to a server, where the notification message carries the address family information of the first peer and the address information of the first peer, so that the server stores a running state of the first peer based on the address family information of the first peer, the address information of the first peer, and a type of the notification message.

According to an eighth aspect, an embodiment of this application further provides an apparatus, including:

an obtaining module, configured to obtain an address type of a first peer and address information of the first peer; and a sending module, configured to send a notification message to a server, where the notification message carries the address type of the first peer and the address information of the first peer, so that the server stores a running state of the first peer based on the address type of the first peer, the address information of the first peer, and a type of the notification message, where the notification message includes a first packet header and a second packet header, the first packet header is located in a header of the notification message, and both the address type of the first peer and the address information of the first peer are located in the second packet header; and the second packet header includes a flags field, the flags field includes at least one first flag bit, and the first flag bit is used to identify the address type of the first peer.

According to a ninth aspect, an embodiment of this application further provides an apparatus, including:

a receiving module, configured to receive and parse a notification message, where the notification message carries address family information of a first peer and address information of the first peer; and a processing module, configured to store a running state of the first peer based on the address family information of the first peer and the address information of the first peer.

According to a tenth aspect, an embodiment of this application further provides an apparatus, including:

a receiving module, configured to receive and parse a notification message, where the notification message carries an address type of a first peer and address information of the first peer; and a processing module, configured to store a running state of the first peer based on the address type of the first peer and the address information of the first peer.

According to an eleventh aspect, this application provides a computer-readable storage medium, including computer instructions. When the computer instructions are run on an electronic device, the electronic device is enabled to perform the method according to any one of the possible implementations of the first aspect, and/or any one of the possible implementations of the second aspect, and/or any one of the possible implementations of the fifth aspect, and/or any one of the possible implementations of the sixth aspect.

According to a twelfth aspect, an embodiment of this application provides a computer program product. When the computer program product is run on a computer, the computer is enabled to perform the method according to any one of the possible implementations of the first aspect, and/or any one of the possible implementations of the second aspect, and/or any one of the possible implementations of the fifth aspect, and/or any one of the possible implementations of the sixth aspect.

It may be understood that the apparatus according to the third aspect, the apparatus according to the fourth aspect, the apparatus according to the seventh aspect, the apparatus according to the eighth aspect, the apparatus according to the ninth aspect, the apparatus according to the tenth aspect, the computer-readable storage medium according to the eleventh aspect, or the computer program product according to the twelfth aspect is configured to perform the method according to any one of the possible implementations of the first aspect, the method according to any one of the possible implementations of the second aspect, the method according to any one of the possible implementations of the fifth aspect, and the method according to any one of the possible implementations of the sixth aspect. Therefore, for beneficial effects that can be achieved, refer to beneficial effects in the corresponding method. Details are not described herein again.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application. Terms used in the implementations of embodiments of this application are merely intended to describe specific embodiments of this application, but not to limit this application.

Embodiments of this application provide a method for monitoring a running state of a peer, an apparatus, and a storage medium. When it is detected that a running state of a peer changes, a notification message carrying address family information of the correspondingly changed peer is reported to a server, so that the peer is monitored by the server more clearly. This helps the server store, based on the address family information, corresponding information of the peer whose running state changes.

The Border Gateway Protocol (BGP) is an inter-public network and inter-autonomous system routing protocol, capable of learning routes between autonomous systems.

BGP dynamically learns routes based on neighbors, that is, peers. BGP can work properly only when a neighbor relationship is normal.

Routers running BGP can transmit packets to each other, and the routers are mutually referred to as peers.

The following describes a method for monitoring a running state of a peer according to an embodiment of this application.

Figure 1A:
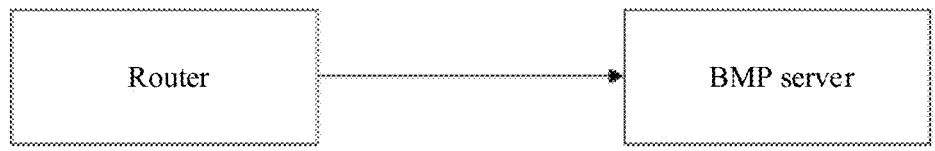
FIG. 1A and FIG. 1B are both schematic diagrams of scenarios for monitoring a running state of a peer according to an embodiment of this application.

FIG. 1A is a schematic diagram of a scenario for monitoring a running state of a peer according to an embodiment of this application. As shown in FIG. 1A, the scenario includes a server and a router. The router runs the BGP. The router also runs the BMP. The router running the BMP may be referred to as a BMP client. The BMP client can monitor a running state of a local router. When the running state of the local router is monitored, the local router may be referred to as a peer of the BMP client. The server may be a BMP server. When the BMP client detects that the running state of the local router changes, the BMP client obtains address family information and address information of the router whose running state changes. Then the BMP client sends a notification message to the BMP server, so that the BMP server stores the running state of the router based on the address family information and the address information of the router whose running state changes. It should be noted that the terms message and packet used in this embodiment of this application may be used interchangeably.

That the running state changes may mean that a BGP route changes. For example, a route is newly added, a route is newly deleted, or a route attribute is updated. In an embodiment, that the running state changes may mean that a BGP peer state changes. For example, the peer state is set to peer up; or the peer state is set to peer down. Correspondingly, the notification message may be a route monitoring message, a peer up message, or a peer down message.

The address family information and the address information may help distinguish the router whose running state changes.

Figure 1B:
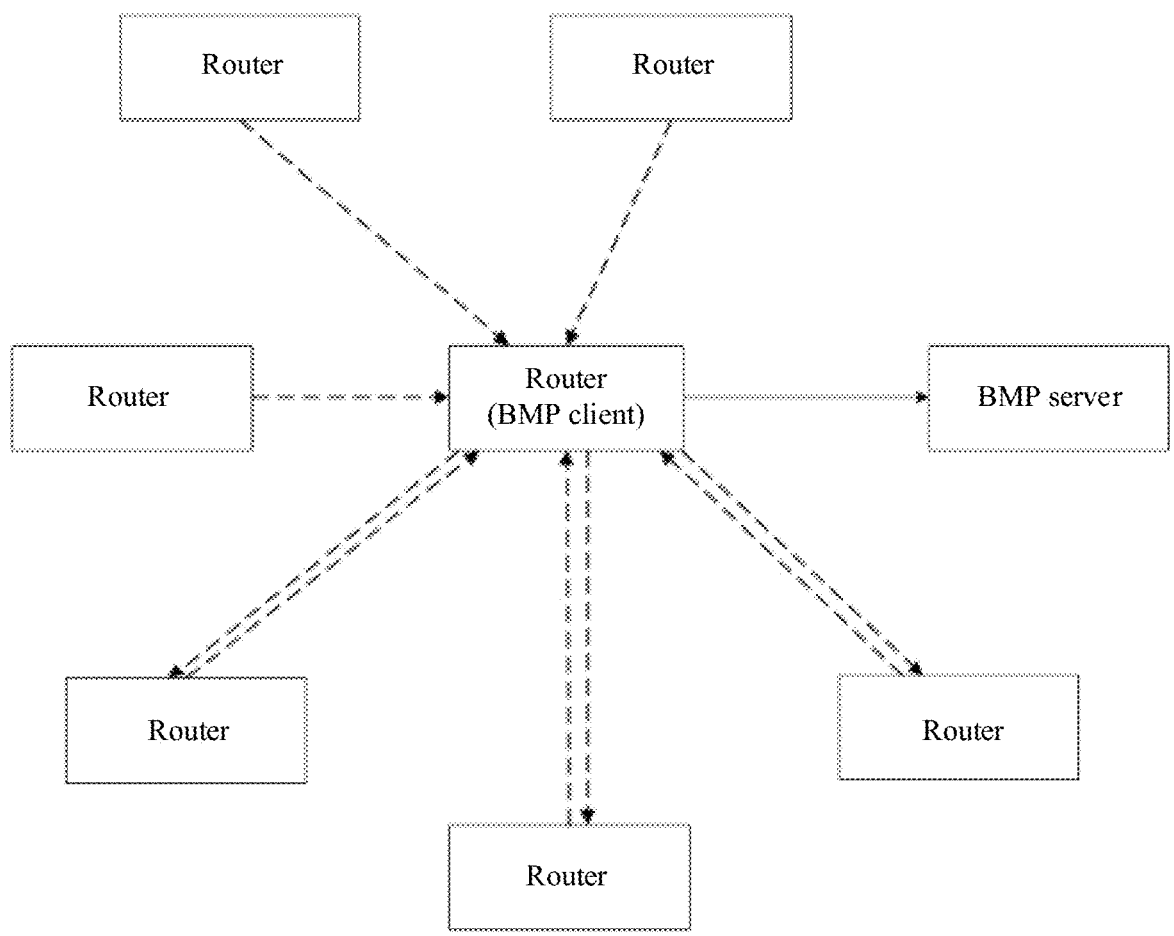

In the foregoing embodiment, only one router is used as an example for description. A quantity of routers is not limited in the solution of this application. In one embodiment, FIG. 1B is a schematic diagram of another scenario for monitoring a running state of a peer according to an embodiment of this application. As shown in FIG. 1B, the scenario includes a server and at least two routers. The at least two routers all run the BGP. At least one of the at least two routers also runs the BMP. The router running the BMP may be referred to as a BMP client. The routers running the BGP may all be referred to as peers of the BMP client. The server may be a BMP server. When the BMP client detects that a running state of each router changes, the BMP client obtains address family information and address information of the router whose running state changes. For example, a peer has an IPv4 unicast address family and a VPNv4 address family, or other address families. When a route corresponding to the IPv4 unicast address family changes or the state changes to a down state, address family information carried in a notification message is IPv4 unicast address family information. Then the BMP client sends the notification message to the BMP server, so that the BMP server stores the running state of the router based on the address family information and the address information of the router whose running state changes.

Figure 2:
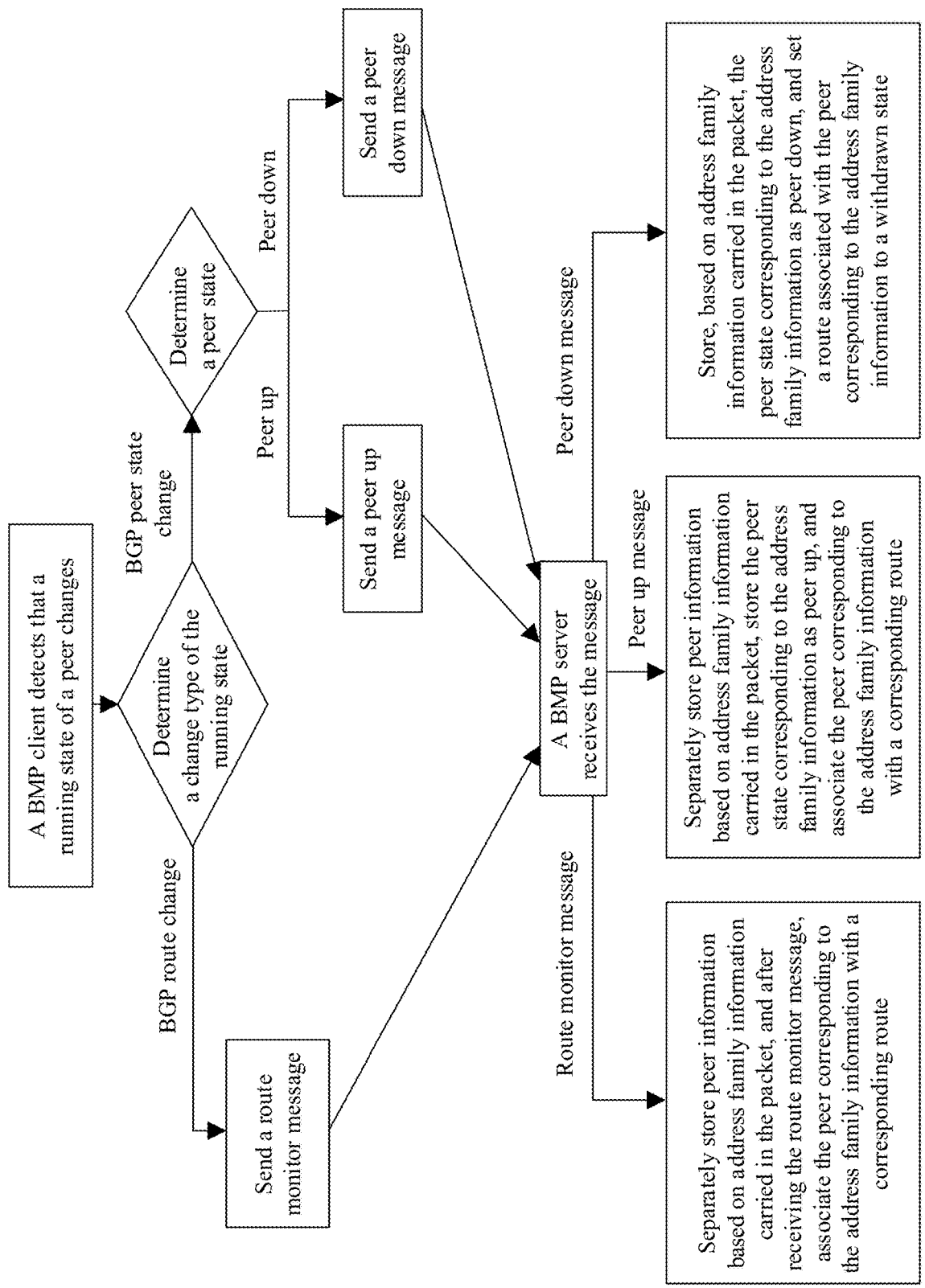
FIG. 2 is a schematic flowchart of a method for monitoring a running state of a peer according to an embodiment of this application.

FIG. 2 is a schematic flowchart of a method for monitoring a running state of a peer according to an embodiment of this application. When detecting that a running state of a peer changes, a BMP client may determine a change type of the running state. The change type of the running state includes a BGP route change and a BGP peer state change.

When the change type of the running state is a BGP route change, the BMP client sends a route monitoring route monitor message to a BMP server. The route monitoring route monitor message carries address family information and address information of the router whose running state changes. The route monitoring message includes changed routing information. After receiving the route monitor message, the BMP server stores peer information based on the address family information and address information carried in the packet, and stores a corresponding route in association with the peer corresponding to the address family information. For example, the server stores the changed routing information in association with the corresponding address family information and address information as one record.

The BMP client determines the peer state when the change type of the running state is a BGP peer state change. The peer state includes peer up and peer down. When the peer state is peer up, the BMP client sends a peer up message to the BMP server. The peer up message carries the address family information and address information of the router whose running state changes. After receiving the peer up message, the BMP server stores the peer information separately based on the address family information and address information carried in the message, stores the peer state corresponding to the address family information as peer up, and associates the peer corresponding to the address family information with the corresponding route.

When the peer state is peer down, the BMP client sends a peer down message to the BMP server. The peer down message carries the address family information and address information of the router whose running state changes. After receiving the peer down message, the BMP server stores, based on the address family information and address information carried in the message, the peer state corresponding to the address family information as peer down, and sets the route associated with the peer corresponding to the address family information to a withdrawn state.

The following describes a method for monitoring a running state of a peer, where the method is implemented on a router side.

Figure 3:
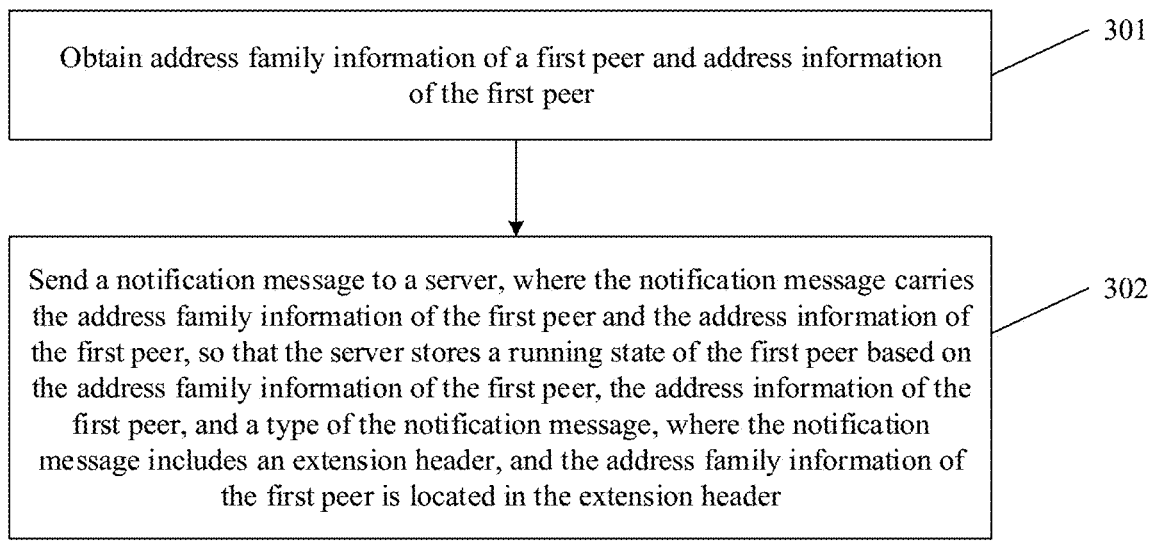
FIG. 3 is a schematic flowchart of a first method for monitoring a running state of a peer according to an embodiment of this application.

FIG. 3 is a schematic flowchart of a method for monitoring a running state of a peer according to an embodiment of this application. The method may be performed by a router having a BMP client function in FIG. 1A and FIG. 1B. The method may include operations 301 and 302. The operations are specifically as follows:

Operation 301. Obtain address family information of a first peer and address information of the first peer.

Before operation 301, the method may further include: triggering operation 301 when detecting that a running state of the first peer changes.

In an embodiment, a BMP client prestores address family information and address information of each peer. When detecting that the running state of the first peer changes, the BMP client obtains prestored address family information and address information of the corresponding first peer.

The change includes a BGP route change. For example, a route is newly added, a route is newly deleted, or a route attribute is updated. The change further includes a BGP peer state change. For example, the peer state is set to peer up; or the peer state is set to peer down.

The address family information is used to identify different route types, such as IPv4 unicast or VPNv4.

The address information refers to an address of the BGP peer. For example, the peer address is 1.1.1.1.

The address family information and the address information may help distinguish the router whose running state changes.

Operation 302. Send a notification message to a server, where the notification message carries the address family information of the first peer and the address information of the first peer, so that the server stores the running state of the first peer based on the address family information of the first peer, the address information of the first peer, and a type of the notification message, where the notification message includes an extension header, and the address family information of the first peer is located in the extension header.

The type of the notification message includes a route monitoring (route monitor) message, a peer up message, or a peer down message.

Figure 4:
FIG. 4 is a schematic diagram of a partial structure of a first packet according to an embodiment of this application.

Preferably, the extension header is in a TLV format. As shown in FIG. 4, the extension header carries type information type of the extension header, length information length of the extension header, and an address family information field used to carry the address family information of the first peer. The address family information field includes an AFI field and a SAFI field. The AFI field is used to carry primary address family information. The SAFI field is used to carry subsequent address group information. For example, if the address family information is IPv4 unicast or IPv4 VPNv4, the primary address family information may be IPv4. The subsequent address group information may be unicast or VPNv4 correspondingly. If the notification message includes more than two pieces of address family information, the notification message may include more than two address family information fields used to carry the more than two pieces of address family information respectively. As shown in FIG. 4, the type information of the extension header and the length information of the extension header respectively occupy eight bits. The primary address family information and the subsequent address group information respectively occupy two bytes. The foregoing is merely used as an implementation, and quantities of bits occupied by the type information of the extension header, the length information of the extension header, and the address family information are not specifically limited.

The notification message further includes a first packet header and a second packet header. The first packet header may be a common packet header common header. Information carried in the first packet header includes packet version information version, packet length information message length, and packet type information message type. The second packet header may be a per peer packet header per peer header. Information carried in the second packet header includes peer type information peer type, a flags field peer flags, peer identification information peer distinguisher, peer address information peer address, a peer AS number peer as, peer BGP address information peer BGP ID, and timestamp information timestamp. The first packet header is located in a header of the notification message. Both the second packet header and the extension header are located after the first packet header.

In one embodiment, the extension header may be located after the second packet header. To be specific, a structure of the notification message may be the first packet header, the second packet header, and the extension header sequentially. In an embodiment, a structure of the notification message may be the first packet header, the extension header, and the second packet header sequentially.

In one embodiment, the extension header is located between the first packet header and the second packet header. The extension header is located before the second packet header. This helps the server first obtain the address family information when parsing the packet, and then parse the address information based on the address family information, and therefore is more logical.

After receiving the notification message, the server parses the notification message to obtain the address family information of the first peer and the address information of the first peer. The server obtains the running state of the first peer based on the type of the notification message. Then the server stores the running state of the first peer based on the address family information of the first peer and the address information of the first peer.

In this embodiment of this application, because the address family information of the corresponding peer is placed in the extension header, peer information monitored in this solution can be clearer, and the information is more reliable. In addition, a manner of processing a peer state change of a single address family is normalized, and is more convenient.

Further, this embodiment of this application further provides a second packet header. The second packet header may be a per peer packet header per peer header. The second packet header includes a flags field peer flags. The flags field may include one or more of the following flag bits:

a first flag bit, where the first flag bit is used to identify an address type of the first peer;

a second flag bit, where the second flag bit is used to identify policy processing information of the first peer;

a third flag bit, where the third flag bit is used to identify a quantity of bytes of an AS number of the first peer;

a fourth flag bit, where the fourth flag bit is used to identify a type of routing information; and a fifth flag bit, where the fifth flag bit is used to identify integrity of the routing information.

The address type of the first peer includes IPv4 or IPv6.

Specifically, the flags field may include the first flag bit; in an embodiment, the flags field may include the first flag bit and the second flag bit; in an embodiment, the flags field may include the first flag bit and the third flag bit; in an embodiment, the flags field may include the first flag bit and the fourth flag bit; in an embodiment, the flags field may include the first flag bit and the fifth flag bit; in an embodiment, the flags field may include the first flag bit, the second flag bit, and the third flag bit; in an embodiment, the flags field may include the first flag bit, the second flag bit, and the fourth flag bit; in an embodiment, the flags field may include the first flag bit, the second flag bit, and the fifth flag bit; in an embodiment, the flags field may include the first flag bit, the third flag bit, and the fourth flag bit; in an embodiment, the flags field may include the first flag bit, the third flag bit, and the fifth flag bit; in an embodiment, the flags field may include the first flag bit, the fourth flag bit, and the fifth flag bit.

Only various combinations including the first flag bit are described above. The flags field in this embodiment of this application may include any one, any two, any three, or any four, or all five of the first flag bit, the second flag bit, the third flag bit, the fourth flag bit, and the fifth flag bit. The solution does not limit a specific form of the flags field.

Specifically, the first flag bit may be a corresponding V flag bit. When the flag bit is set to 1, it indicates that the address type of the first peer is IPv6. When the field corresponding to the flag bit is set to 0, it indicates that the address type of the first peer is IPv4.

The second flag bit may be a corresponding L flag bit. When a field corresponding to the flag bit is set to 1, it indicates that the policy processing information of the first peer is post-policy processing. When the field corresponding to the flag bit is set to 0, it indicates that the first peer is pre-policy processing.

The third flag bit may be a corresponding A flag bit. When a field corresponding to the flag bit is set to 1, it indicates that the quantity of bytes of the AS number of the first peer is 2. When the field corresponding to the flag bit is set to 0, it indicates that the quantity of bytes of the AS number of the first peer is 4.

The fourth flag bit may be a corresponding 0 flag bit. When a field corresponding to the flag bit is set to 1, it indicates that an information type of each route that can be monitored is correspondingly received routing information. When the field corresponding to the flag bit is set to 0, it indicates that the information type of each route that can be monitored is correspondingly sent routing information.

The fifth flag bit may be a corresponding F flag bit. When a field corresponding to the flag bit is set to 1, it indicates that the routing information sent by the client to the server is complete. When the field corresponding to the flag bit is set to 0, it indicates that the routing information sent by the client to the server is incomplete.

In one embodiment, the flags field includes the second flag bit L, the third flag bit A, the fourth flag bit O, and the fifth flag bit F. A sequence of positions of the flag bits is not limited herein. The flag bits may correspond to any sequence of positions in the foregoing flags field.

In this embodiment of this application, the server may further obtain routing table information of the monitored peer by parsing the flags field. It is very convenient.

It should be noted that the flags field peer flags in the second packet header provided in this embodiment of this application may be an improvement over the flags field in the second packet header based on the embodiment shown in FIG. 3.

Figure 5:
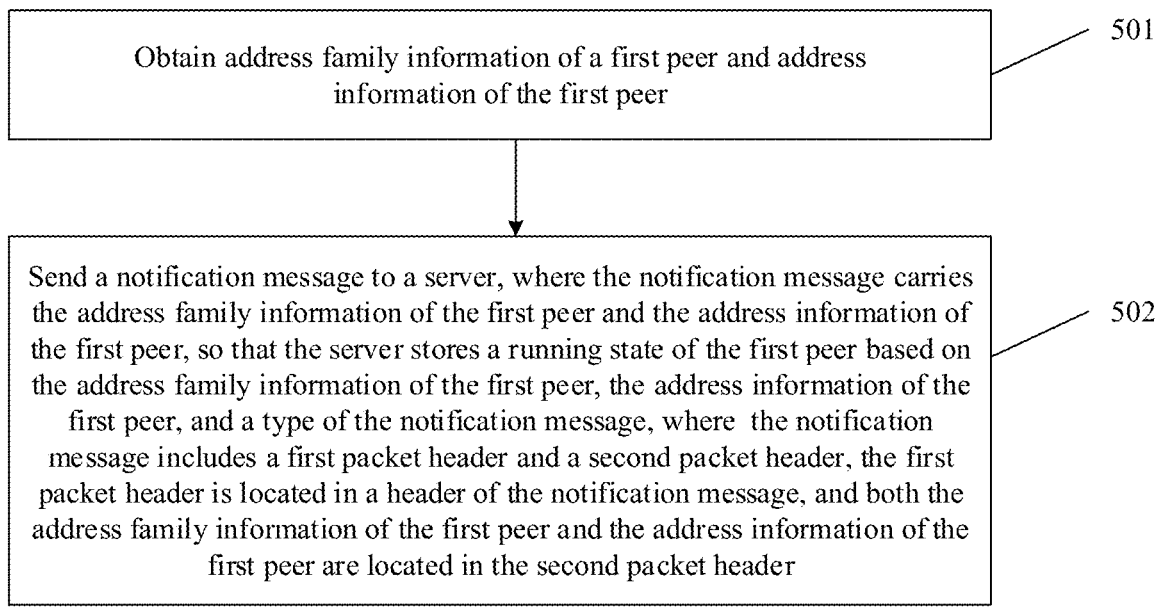
FIG. 5 is a schematic flowchart of a second method for monitoring a running state of a peer according to an embodiment of this application.

FIG. 5 is a schematic flowchart of another method for monitoring a running state of a peer according to an embodiment of this application. The method may be performed by a router having a BMP client function in FIG. 1A and FIG. 1B. As shown in FIG. 5, the method may include operations 501 and 502. The operations are specifically as follows:

Operation 501. Obtain address family information of a first peer and address information of the first peer.

Before operation 501, the method may further include: triggering operation 501 when detecting that a running state of the first peer changes.

In an implementation, a BMP client prestores address family information and address information of each peer. When detecting that the running state of the first peer changes, the BMP client obtains prestored address family information and address information of the corresponding first peer.

Operation 502. Send a notification message to a server, where the notification message carries the address family information of the first peer and the address information of the first peer, so that the server stores the running state of the first peer based on the address family information of the first peer, the address information of the first peer, and a type of the notification message, where the notification message includes a first packet header and a second packet header, the first packet header is located in a header of the notification message, and both the address family information of the first peer and the address information of the first peer are located in the second packet header.

The type of the notification message includes a route monitoring (route monitor) message, a peer up message, or a peer down message.

The first packet header may be a common packet header common header. Information carried in the first packet header includes packet version information, packet length information, and packet type information. The second packet header may be a per peer header. Information carried in the second packet header includes the address family information of the first peer and the address information of the first peer. The second packet header is located after the first packet header.

Figure 6:
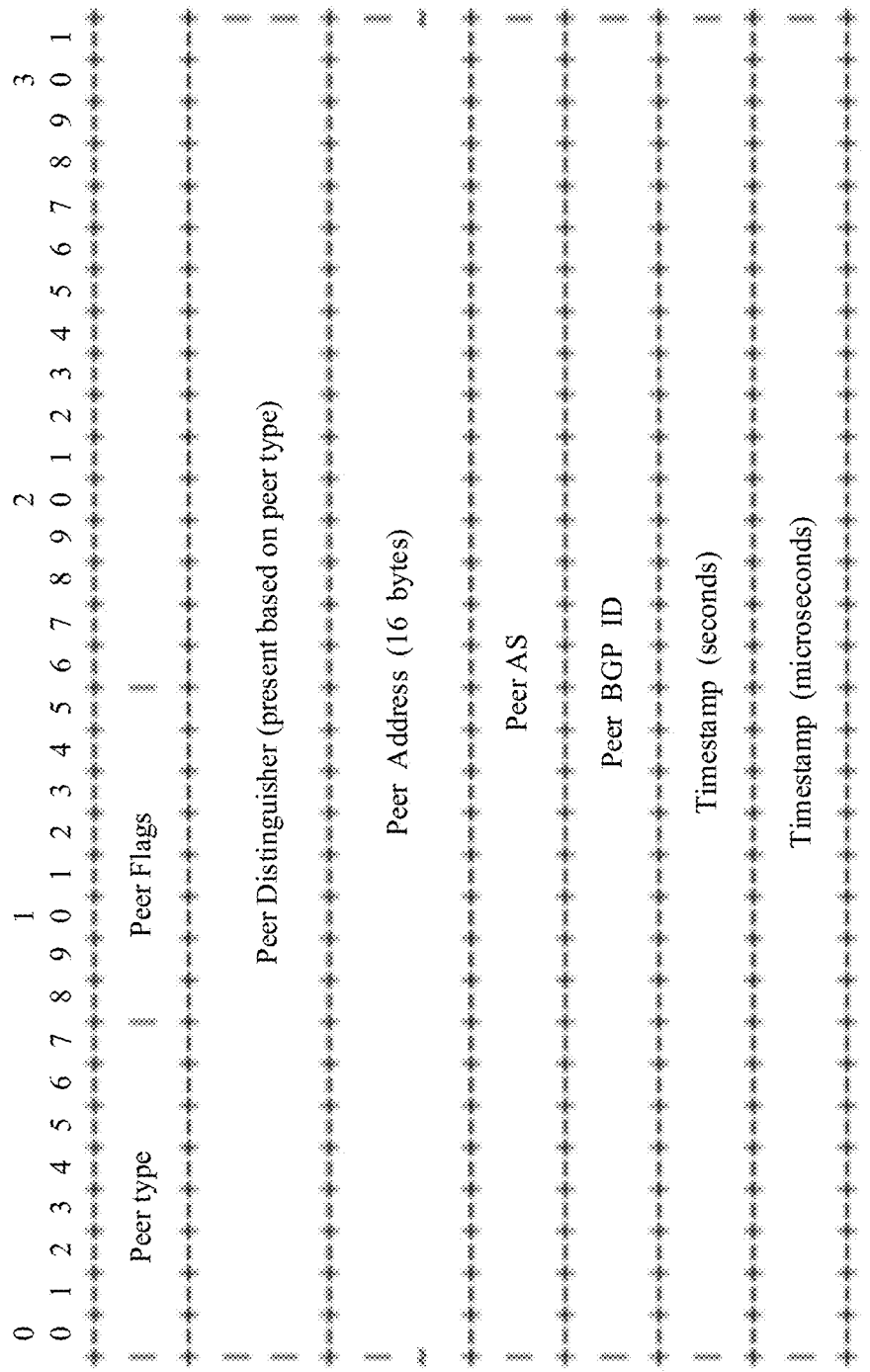
FIG. 6 is a schematic diagram of a partial structure of a packet in the related art.
Figure 7:
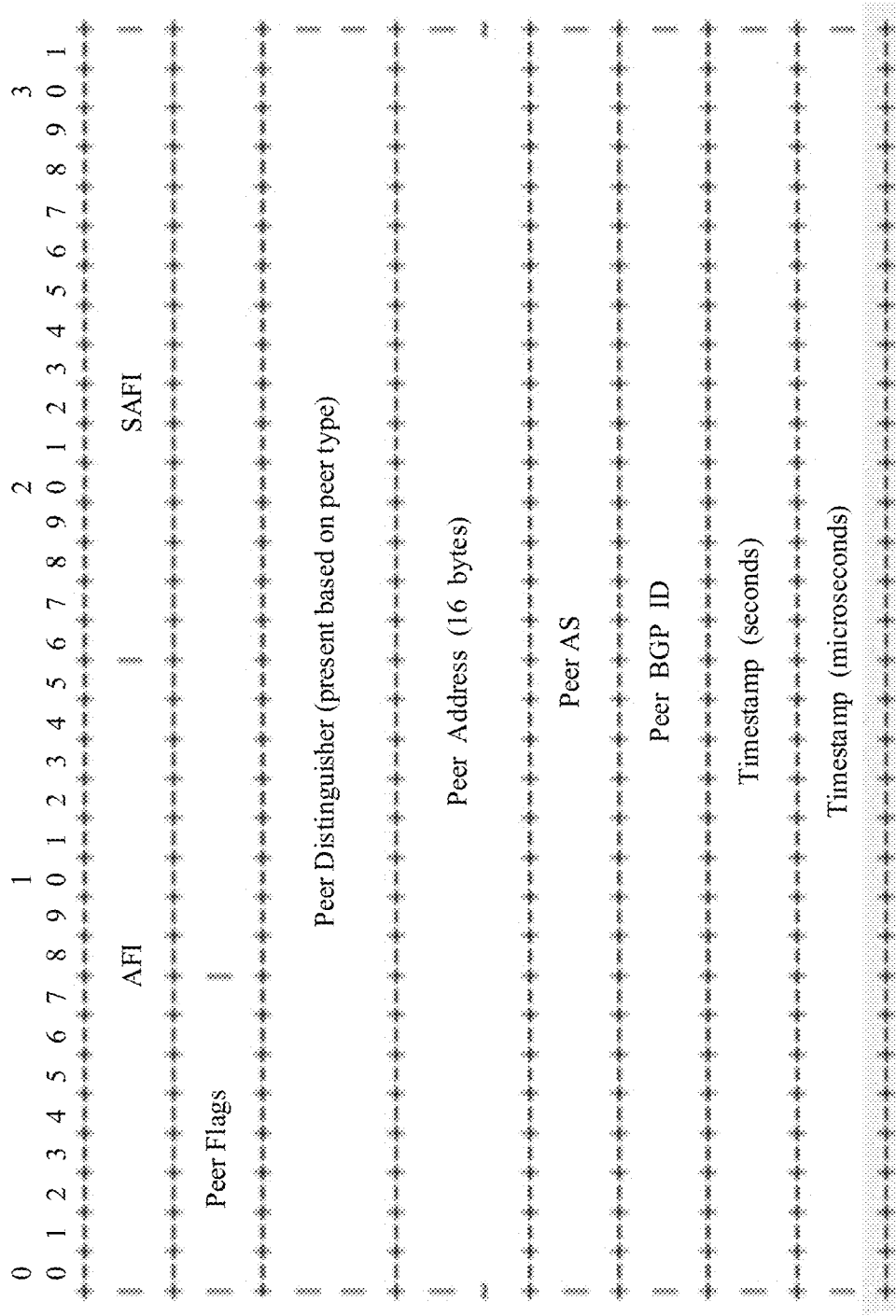
FIG. 7 is a schematic diagram of a partial structure of a second packet according to an embodiment of this application.

That the address family information of the first peer is located in the second packet header may be that a peer type in a second packet header in the related art is replaced with the address family information of the first peer. FIG. 6 is a schematic diagram of a structure of a second packet header in the related art. FIG. 7 is a schematic diagram of a structure of a second packet header according to an embodiment of this application. In other words, the second packet header in this solution does not include the peer type information peer type. The address family information of the first peer is located in a peer type position in the original per peer header. By using the foregoing means, the address family information of the first peer is located in the second packet header. In this implementation, the information carried in the second packet header includes a flags field, identification information of the first peer, the address information of the first peer, an AS number of the first peer, BGP address information of the first peer, timestamp information, and an address family information field used to carry the address family information of the first peer. The address family information field includes an AFI field and a SAFI field. The AFI field is used to carry primary address family information. The SAFI field is used to carry subsequent address group information. For example, if the address family information is IPv4 unicast or IPv4 VPNv4, the primary address family information may be IPv4 correspondingly. The subsequent address group information may be unicast or VPNv4 correspondingly. If the notification message includes more than two pieces of address family information, the notification message may include more than two address family information fields used to carry the more than two pieces of address family information respectively. As shown in FIG. 7, the address family information of the first peer includes the primary address family information and the subsequent address group information. The primary address family information and the subsequent address group information respectively occupy two bytes.

In another embodiment, that the address family information of the first peer is located in the second packet header may be that the address family information of the first peer is information added to the second packet header. In other words, the address family information of the first peer is newly added to the second packet header in the related art, so that the address family information of the first peer is located in the second packet header. The address family information of the first peer may be located at any position in the second packet header. In this implementation, information carried in the second packet header includes the address family information of the first peer, a peer type peer type, a flags field, identification information of the first peer, the address information of the first peer, an AS number of the first peer, BGP address information of the first peer, and timestamp information.

Figures 8, 9, 10:
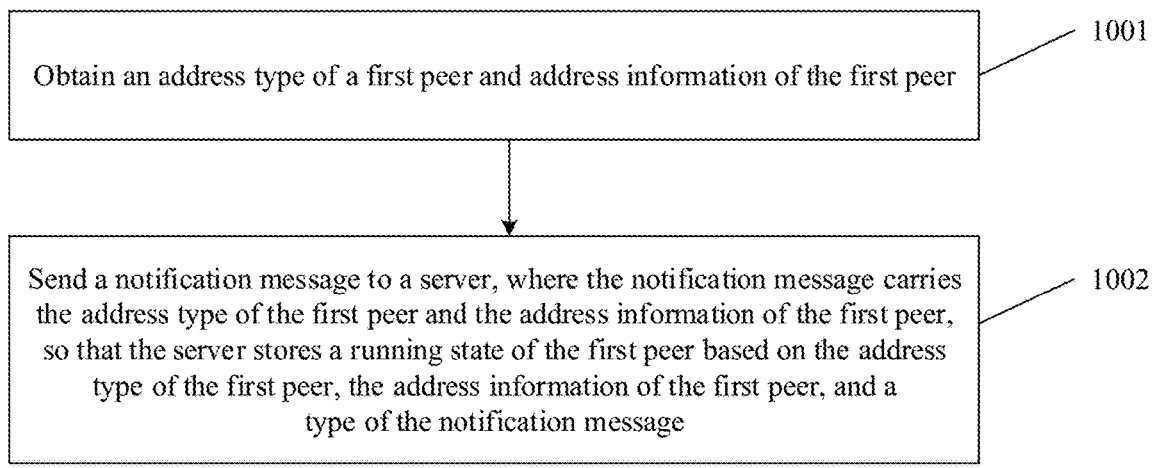
FIG. 8 is a schematic diagram of a partial structure of a second packet according to an embodiment of this application.
FIG. 9 is a schematic diagram of a partial structure of a second packet according to an embodiment of this application.
FIG. 10 is a schematic flowchart of a third method for monitoring a running state of a peer according to an embodiment of this application.

As shown in FIG. 8, because a packet structure of the existing per peer header is changed, to avoid an incompatibility problem caused by inability of parsing the packet structure in this solution by using an existing packet parsing method, the corresponding version information in the first packet header needs to be changed to new version information. The new version information is different from earlier version information. In other words, the new version information is extended packet version information. The earlier version information may be version information corresponding to a packet that does not use this solution and does not change a packet header structure in the conventional technology. If the earlier version information is 3, the new version information is different from the earlier version information. The new version information may be 4.

In an embodiment, the second packet header includes a flags field, and the flags field may include at least one or more of the following flag bits:
  a first flag bit, where the first flag bit is used to identify an address type of the first peer;
  a second flag bit, where the second flag bit is used to identify policy processing information of the first peer;
  a third flag bit, where the third flag bit is used to identify a quantity of bytes of an AS number of the first peer;
  a fourth flag bit, where the fourth flag bit is used to identify a type of routing information; and
  a fifth flag bit, where the fifth flag bit is used to identify integrity of the routing information.

Specifically, the flags field may include the first flag bit; in an embodiment, the flags field may include the first flag bit and the second flag bit; in an embodiment, the flags field may include the first flag bit and the third flag bit; in an embodiment, the flags field may include the first flag bit and the fourth flag bit; in an embodiment, the flags field may include the first flag bit and the fifth flag bit; in an embodiment, the flags field may include the first flag bit, the second flag bit, and the third flag bit; in an embodiment, the flags field may include the first flag bit, the second flag bit, and the fourth flag bit; in an embodiment, the flags field may include the first flag bit, the second flag bit, and the fifth flag bit; in an embodiment, the flags field may include the first flag bit, the third flag bit, and the fourth flag bit; in an embodiment, the flags field may include the first flag bit, the third flag bit, and the fifth flag bit; in an embodiment, the flags field may include the first flag bit, the fourth flag bit, and the fifth flag bit.

Only various combinations including the first flag bit are described above. The flags field in this embodiment of this application may include any one, any two, any three, or any four, or all five of the first flag bit, the second flag bit, the third flag bit, the fourth flag bit, and the fifth flag bit. The solution does not limit a specific form of the flags field.

Specifically, the first flag bit may be a corresponding V flag bit. When a field corresponding to the flag bit is set to 1, it indicates that the address type of the first peer is IPv6. When the field corresponding to the flag bit is set to 0, it indicates that the address type of the first peer is IPv4.

The second flag bit may be a corresponding L flag bit. When a field corresponding to the flag bit is set to 1, it indicates that the first peer is post-policy processing. When the field corresponding to the flag bit is set to 0, it indicates that the first peer is pre-policy processing.

The third flag bit may be a corresponding A flag bit. When a field corresponding to the flag bit is set to 1, it indicates that the quantity of bytes of the AS number of the first peer is 2. When the field corresponding to the flag bit is set to 0, it indicates that the quantity of bytes of the AS number of the first peer is 4.

The fourth flag bit may be a corresponding O flag bit. When a field corresponding to the flag bit is set to 1, it indicates that an information type of each route that can be monitored is correspondingly received routing information. When the field corresponding to the flag bit is set to 0, it indicates that the information type of each route that can be monitored is correspondingly sent routing information.

The fifth flag bit may be a corresponding F flag bit. When a field corresponding to the flag bit is set to 1, it indicates that the routing information sent by the client to the server is complete. When the field corresponding to the flag bit is set to 0, it indicates that the routing information sent by the client to the server is incomplete.

Preferably, as shown in FIG. 9, the flags field includes the second flag bit L, the third flag bit A, the fourth flag bit O, and the fifth flag bit F. A sequence of positions of the flag bits is not limited herein. The flag bits may correspond to any sequence of positions in the foregoing flags field.

After receiving the notification message, the server parses the notification message. When the corresponding version information in the notification message is earlier version information such as 3, the server performs parsing processing based on an original BMP packet format. If the corresponding version information in the notification message is new version information such as 4, the server parses the notification message to obtain the address family information of the first peer and the address information of the first peer. The server obtains the running state of the first peer based on the type of the notification message. Then the server stores the running state of the first peer based on the address family information of the first peer and the address information of the first peer.

In the conventional technology, peer address information carried in a local RIB packet of a local route is a virtual peer, and an address field is filled with all 0s. Currently, it is impossible to distinguish whether an address type is IPv4 or IPv6 correspondingly, and therefore, the peer address cannot be parsed. Currently, IPv4 and IPv6 cannot be distinguished. As a result, in a case of virtual routing and forwarding (VRF), if monitored IPv4 information and IPv6 information both exist in a same VRF instance (with a same RD), because the server cannot distinguish between IPv4 and IPv6, the peer cannot be accurately associated with the route. As a result, a route state cannot be accurately reflected.

To resolve the foregoing technical problem, an embodiment of this application further provides a method for monitoring a running state of a peer. As shown in FIG. 10, the method may include operations 1001 and 1002. The operations are specifically as follows:

Operation 1001. Obtain an address type of a first peer and address information of the first peer.

Operation 1002. Send a notification message to a server, where the notification message carries the address type of the first peer and the address information of the first peer, so that the server stores a running state of the first peer based on the address type of the first peer, the address information of the first peer, and a type of the notification message.

The notification message includes a first packet header and a second packet header, the first packet header is located in a header of the notification message, the second packet header includes a flags field, the flags field includes at least one first flag bit, and the first flag bit is used to identify the address type of the first peer.

Specifically, the first flag bit may be a corresponding V flag bit. When a field corresponding to the flag bit is set to 1, it indicates that the address type of the first peer is IPv6. When the field corresponding to the flag bit is set to 0, it indicates that the address type of the first peer is IPv4.

Further, the flags field further includes one or more of the following flag bits:

a second flag bit, where the second flag bit is used to identify policy processing information of the first peer;
a third flag bit, where the third flag bit is used to identify a quantity of bytes of an AS number of the first peer;
a fourth flag bit, where the fourth flag bit is used to identify a type of routing information; and
a fifth flag bit, where the fifth flag bit is used to identify integrity of the routing information.

Specifically, the second flag bit may be a corresponding L flag bit. When a field corresponding to the flag bit is set to 1, it indicates that the first peer is post-policy processing. When the field corresponding to the flag bit is set to 0, it indicates that the first peer is pre-policy processing.

The third flag bit may be a corresponding A flag bit. When a field corresponding to the flag bit is set to 1, it indicates that the quantity of bytes of the AS number of the first peer is 2. When the field corresponding to the flag bit is set to 0, it indicates that the quantity of bytes of the AS number of the first peer is 4.

The fourth flag bit may be a corresponding O flag bit. When a field corresponding to the flag bit is set to 1, it indicates that an information type of each route that can be monitored is correspondingly received routing information. When the field corresponding to the flag bit is set to 0, it indicates that the information type of each route that can be monitored is correspondingly sent routing information.

The fifth flag bit may be a corresponding F flag bit. When a field corresponding to the flag bit is set to 1, it indicates that the routing information sent by the client to the server is complete. When the field corresponding to the flag bit is set to 0, it indicates that the routing information sent by the client to the server is incomplete.

Figure 11:
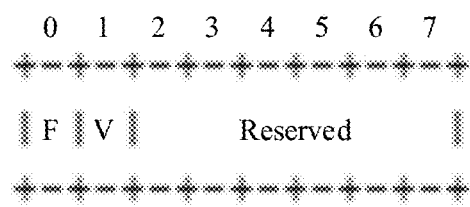
FIG. 11 is a schematic diagram of a partial structure of a third packet according to an embodiment of this application.

In one embodiment, as shown in FIG. 11, the flags field includes the first flag bit V and the fifth flag bit F.

Figure 12:
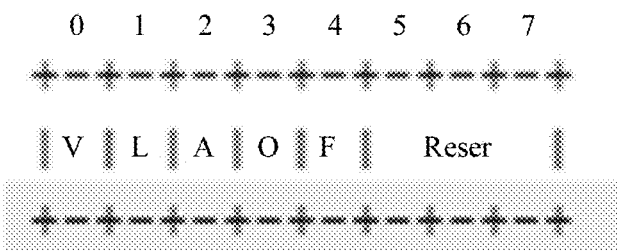
FIG. 12 is a schematic diagram of a partial structure of another packet according to an embodiment of this application.

In an embodiment, as shown in FIG. 12, the flags field includes the first flag bit V, the second flag bit L, the third flag bit A, the fourth flag bit O, and the fifth flag bit F. A sequence of positions of the flag bits is not limited herein. The flag bits may correspond to any sequence of positions in the foregoing flags field.

After receiving the notification message, the server parses the notification message. The server may obtain the address type of the monitored peer by parsing the flags field, to distinguish whether the address type of the first peer is IPv4 or IPv6.

It should be noted that, in this embodiment of this application, address family information of the first peer may be further obtained. The address family information may be carried in the extension header in the embodiment in FIG. 3, or may be carried in the second packet header in the embodiment in FIG. 5.

An embodiment of this application further provides an apparatus, including one or more processors and one or more memories, where the one or more memories are coupled to the one or more processors, the one or more memories are configured to store computer program code, and the computer program code includes computer instructions; and when the one or more processors execute the computer instructions, the apparatus is enabled to perform the following solution:
when the one or more processors execute the computer instructions, the apparatus is enabled to perform the following operations:
obtaining address family information of a first peer and address information of the first peer; and
sending a notification message to a server, where the notification message carries the address family information of the first peer and the address information of the first peer, so that the server stores a running state of the first peer based on the address family information of the first peer, the address information of the first peer, and a type of the notification message.

The notification message includes an extension header, and the address family information of the first peer is located in the extension header.

The extension header is in a TLV format.

The notification message further includes a first packet header and a second packet header, and the first packet header is located in a header of the notification message.

The extension header is located between the first packet header and the second packet header.

The notification message includes a first packet header and a second packet header, the first packet header is located in a header of the notification message, and both the address family information of the first peer and the address information of the first peer are located in the second packet header.

The address family information of the first peer replaces peer type information.

The first packet header includes first version information, and the first version information is different from earlier version information.

The address family information of the first peer includes primary address family information and subsequent address family information.

The second packet header includes a flags field, and the flags field includes at least one or more of the following flag bits:
a first flag bit, where the first flag bit is used to identify an address type of the first peer;
a second flag bit, where the second flag bit is used to identify policy processing information of the first peer;
a third flag bit, where the third flag bit is used to identify a quantity of bytes of an AS number of the first peer;
a fourth flag bit, where the fourth flag bit is used to identify a type of routing information; and
a fifth flag bit, where the fifth flag bit is used to identify integrity of the routing information.

The first packet header is a common packet header common header.

The second packet header is a per peer packet header per peer header.

The address type of the first peer includes IPv4 or IPv6.

The type of the notification message includes a route monitoring message, a peer up message, or a peer down message.

When the type of the notification message is the route monitoring message, the route monitoring message includes changed routing information, and that the server stores a running state of the first peer based on the address family information of the first peer, the address information of the first peer, and a type of the notification message includes: the server stores the changed routing information in association with the address family information of the first peer and the address information of the first peer.

When the type of the notification message is the peer up message, that the server stores a running state of the first peer based on the address family information of the first peer, the address information of the first peer, and a type of the notification message includes: the server stores the peer up running state of the first peer in association with the address family information of the first peer and the address information of the first peer.

When the type of the notification message is the peer down message, that the server stores a running state of the first peer based on the address family information of the first peer, the address information of the first peer, and a type of the notification message includes: the server stores the peer down running state of the first peer in association with the address family information of the first peer and the address information of the first peer.

According to another aspect, an embodiment of this application provides an apparatus, including one or more processors and one or more memories, where the one or more memories are coupled to the one or more processors, the one or more memories are configured to store computer program code, and the computer program code includes computer instructions; and when the one or more processors execute the computer instructions, the apparatus is enabled to perform the following solution:

when the one or more processors execute the computer instructions, the apparatus is enabled to perform the following operations:
obtaining an address type of a first peer and address information of the first peer; and
sending a notification message to a server, where the notification message carries the address type of the first peer and the address information of the first peer, so that the server stores a running state of the first peer based on the address type of the first peer, the address information of the first peer, and a type of the notification message, where
the notification message includes a first packet header and a second packet header, the first packet header is located in a header of the notification message, and both the address type of the first peer and the address information of the first peer are located in the second packet header; and the second packet header includes a flags field, the flags field includes at least one first flag bit, and the first flag bit is used to identify the address type of the first peer.

The flags field further includes one or more of the following flag bits:
a second flag bit, where the second flag bit is used to identify policy processing information of the first peer;
a third flag bit, where the third flag bit is used to identify a quantity of bytes of an AS number of the first peer;
a fourth flag bit, where the fourth flag bit is used to identify a type of routing information; and
a fifth flag bit, where the fifth flag bit is used to identify integrity of the routing information.

The address type of the first peer includes IPv4 or IPv6.

The apparatus is further configured to obtain address family information of the first peer.

The address family information of the first peer is located in the second packet header of the notification message.

The address family information of the first peer replaces peer type information.

The first packet header includes first version information, and the first version information is different from earlier version information.

The notification message further includes an extension header, and the address family information of the first peer is located in the extension header.

The extension header is in a TLV format.

The address family information of the first peer includes primary address family information and subsequent address family information.

Figure 13:
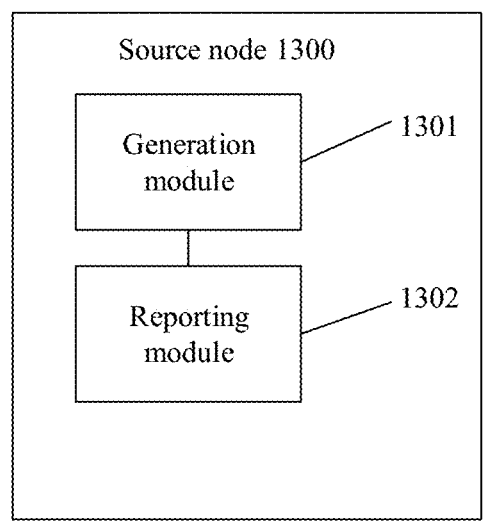
FIG. 13 is a schematic diagram of a source node 1300 in a communications network according to an embodiment of this application.

Referring to FIG. 13, an embodiment of this application provides a source node 1300 in a communications network.

The source node 1300 may be the BMP client in the embodiment shown in FIG. 1A or FIG. 1B. The communications network includes the source node, one or more intermediate nodes, and a destination node. The source node 1300 includes:

a generation module 1301, configured to generate a notification message that includes address family information of a first peer and address information indication information of the first peer, or generate a notification message that includes an address type of the first peer and address information indication information of the first peer, where for a specific implementation process, refer to operation 301 in the embodiment in FIG. 3 and operation 501 in the embodiment in FIG. 5, or refer to operation 1001 in the embodiment in FIG. 10; and a reporting module 1302, configured to send the notification message to a next-hop node of the source node, to instruct the next-hop node of the source node to perform the method for monitoring a running state of a peer as shown in FIG. 3 or FIG. 5, where for a specific implementation process, refer to operation 302 in the embodiment in FIG. 3 and operation 502 in the embodiment in FIG. 5, or refer to operation 1002 in the embodiment in FIG. 10.

In one embodiment, the notification message includes an extension header, and the address family information of the first peer is located in the extension header.

In one embodiment, the extension header is in a TLV format.

In one embodiment, the notification message further includes a first packet header and a second packet header, and the first packet header is located in a header of the notification message.

In one embodiment, the extension header is located between the first packet header and the second packet header.

In one embodiment, the notification message includes a first packet header and a second packet header, the first packet header is located in a header of the notification message, and both the address family information of the first peer and the address information of the first peer are located in the second packet header.

In one embodiment, the address family information of the first peer replaces peer type information.

In one embodiment, the address family information of the first peer includes primary address family information and subsequent address family information.

In one embodiment, the first packet header includes notification message version information, and the notification message version information is different from earlier packet version information.

In one embodiment, the second packet header includes a flags field, and the flags field includes at least one or more of the following flag bits:
a first flag bit, where the first flag bit is used to identify the address type of the first peer;
a second flag bit, where the second flag bit is used to identify policy processing information of the first peer;
a third flag bit, where the third flag bit is used to identify a quantity of bytes of an AS number of the first peer;
a fourth flag bit, where the fourth flag bit is used to identify a type of routing information; and
a fifth flag bit, where the fifth flag bit is used to identify integrity of the routing information.

In one embodiment, the address type of the first peer includes IPv4 or IPv6.

In this embodiment of this application, because address family information of a corresponding peer is placed in a packet, peer information monitored in this solution can be clearer, and the information is more reliable. In addition, a manner of processing a peer state change of a single address family is normalized, and is more convenient.

On the other hand, in this embodiment of this application, the address type of the peer is obtained, and the address type is encapsulated into the flags field of the second packet header, so that different address types can be distinguished. Therefore, a problem that V4 and V6 cannot be distinguished in the conventional technology is resolved.

Figure 14:
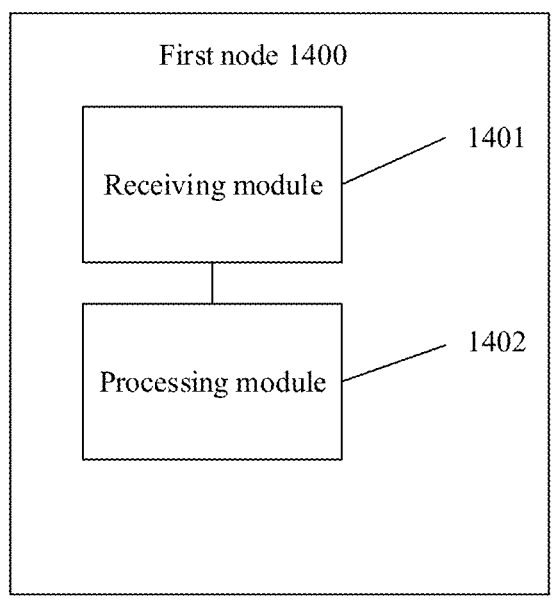
FIG. 14 is a schematic diagram of a first node 1400 in a communications network according to an embodiment of this application.

Referring to FIG. 14, an embodiment of this application provides a first node 1400 in a communications network. The first node 1400 may be the BMP server in the embodiment shown in FIG. 1A or FIG. 1B. The first node may be a router, or may be a switch, or another network device for forwarding a packet. The communications network includes a source node, one or more intermediate nodes, and a destination node. The first node is any one of the one or more intermediate nodes. The first node 1400 includes:

a receiving module 1401, configured to receive and parse a notification message, where the notification message carries an address type of a first peer and address information of the first peer; or the notification message carries address family information of a first peer and address information of the first peer, where for a specific implementation process, refer to the embodiment in FIG. 3, the embodiment in FIG. 5, or the embodiment in FIG. 10, and details are not described herein again; and a processing module 1402, configured to store a running state of the first peer based on the address type of the first peer, the address information of the first peer, and a type of the notification message; or store a running state of the first peer based on the address family information of the first peer, the address information of the first peer, and a type of the notification message, where for a specific implementation process, refer to the embodiment in FIG. 3, the embodiment in FIG. 5, or the embodiment in FIG. 10, and details are not described herein again.

In this embodiment of this application, because address family information of a corresponding peer is placed in a packet, peer information monitored in this solution can be clearer, and the information is more reliable. In addition, a manner of processing a peer state change of a single address family is normalized, and is more convenient.

Figure 15:
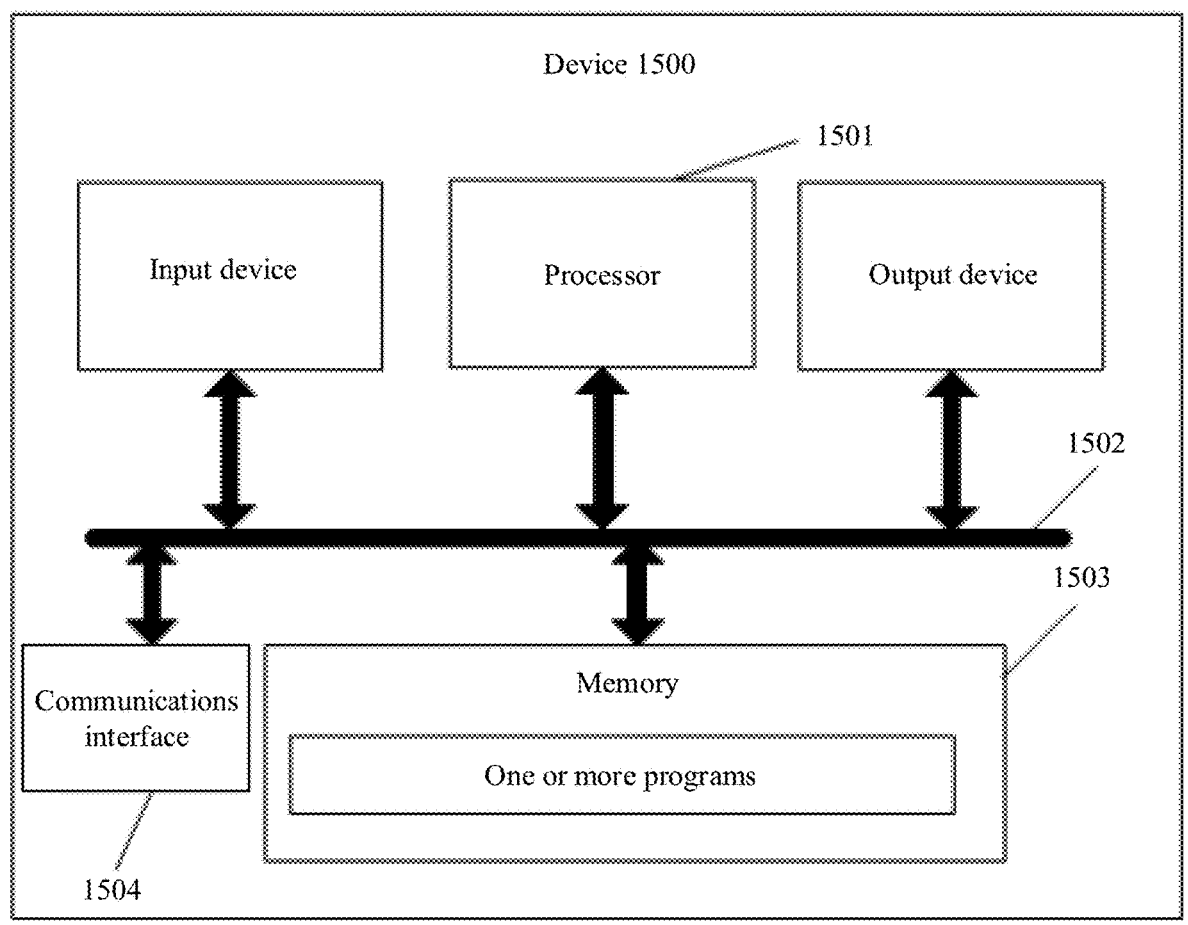
FIG. 15 is a schematic diagram of a structure of a device 1500 according to an embodiment of this application.

FIG. 15 is a schematic diagram of a structure of a device 1500 according to an embodiment of this application. Both the source node and the intermediate node in the embodiments in FIG. 13 and FIG. 14 may be implemented by using the device 1500 shown in FIG. 15. In this case, the device 1500 may be a switch, a router, or another network device for forwarding a packet. Referring to FIG. 15, the device includes at least one processor 1501, a communications bus 1502, a memory 1503, and at least one communications interface 1504.

The processor 1501 may be a general-purpose central processing unit (CPU), an application-specific integrated circuit (ASIC), or one or more integrated circuits for controlling program execution of the solutions of this application. The processor is configured to obtain address family information of a first peer and address information of the first peer; and send a notification message to a server, where the notification message carries the address family information of the first peer and the address information of the first peer, so that the server stores a running state of the first peer based on the address family information of the first peer, the address information of the first peer, and a type of the notification message. For a specific implementation process, refer to operations 301 and 302 in the embodiment in FIG. 3 or operations 501 and 502 in the embodiment in FIG. 5. Operations 301 and 302 in the embodiment shown in FIG. 3, and operations 501 and 502 in the embodiment shown in FIG. 5 are not described herein again.

The communications bus 1502 may include a path, to transmit information between the foregoing components.

The memory 1503 may be a read-only memory (ROM) or another type of static storage device that can store static information and instructions, or a random access memory (RAM) or another type of dynamic storage device that can store information and instructions. The memory 1503 may In an embodiment be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of an instruction or a data structure and that can be accessed by a computer. However, the memory 1503 is not limited thereto. The memory 1503 may exist independently, and is connected to the processor 1501 through the communications bus 1502. In an embodiment, the memory 1503 may be integrated with the processor 1501.

The memory 1503 is configured to store program code, and execution is controlled by the processor 1501, to perform the path detection method provided in any one of the foregoing embodiments. The processor 1501 is configured to execute the program code stored in the memory 1503. The program code may include one or more software modules. Any node in the communications network may determine, by using the processor 1501 and one or more software modules in the program code in the memory 1503, data used for developing an application.

The communications interface 1504 is any apparatus such as a transceiver, and is configured to communicate with another device or a communications network such as the Ethernet, a radio access network (RAN), or a wireless local area network (WLAN).

In a specific implementation, in an embodiment, the device may include a plurality of processors. Each of these processors may be a single-core (single-CPU) processor, or may be a multi-core (multi-CPU) processor. The processor herein may be one or more devices, circuits, and/or processing cores for processing data (for example, a computer program instruction).

It may be understood that, when the device shown in FIG. 15 is the first node in the foregoing method embodiment, in this embodiment, a virtual first node may also be implemented based on a general physical server in combination with a network function virtualization NFV technology. The virtual first node is a virtual router, and second, third, and $N^{th}$ nodes may be virtualized (depending on an actual requirement). The virtual first node may be a virtual machine (VM) on which a program used for providing a message sending function runs, and the virtual machine is deployed on a hardware device (for example, a physical server). The virtual machine is a complete software-simulated computer system that has complete hardware system functions and that runs in a completely isolated environment. After reading this application, with reference to the NFV technology, a person skilled in the art may virtualize, on the general physical server, a plurality of first nodes having the foregoing functions. Details are not described herein.

This application further provides a computer-readable storage medium, including computer instructions. When the computer instructions are run on an electronic device, the electronic device is enabled to perform the method provided in any one of the foregoing possible implementations.

An embodiment of this application provides a computer program product. When the computer program product is run on a computer, the computer is enabled to perform the method provided in any one of the foregoing possible implementations.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether these functions are performed by hardware or software depends on particular applications and designed constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the operations of the method in embodiments of this application may be adjusted, combined, and deleted based on an actual requirement.

The modules in the apparatus in embodiments of this application may be combined, divided, and deleted based on an actual requirement.

According to the foregoing description, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for monitoring a running state of a peer, wherein the method comprises:
    obtaining, by a routing device, address family information of a first peer and address information of the first peer; and
    sending, by the routing device, a notification message to a server, wherein the notification message carries the address family information of the first peer and the address information of the first peer, wherein the server stores a running state of the first peer based on the address family information of the first peer, the address information of the first peer, and a type of the notification message.

2. The method according to claim 1, wherein the notification message comprises an extension header, and the address family information of the first peer is located in the extension header.

3. The method according to claim 2, wherein the extension header is in a type-length-value (TLV) format.

4. The method according to claim 1, wherein the notification message further comprises a first packet header and a second packet header, and the first packet header is located in a header of the notification message.

5. The method according to claim 4, wherein an extension header is located between the first packet header and the second packet header.

6. The method according to claim 1, wherein the notification message comprises a first packet header and a second packet header, the first packet header is located in a header of the notification message, and both the address family information of the first peer and the address information of the first peer are located in the second packet header.

7. The method according to claim 6, wherein the address family information of the first peer replaces peer type information.

8. The method according to claim 6, wherein the first packet header comprises first version information, and the first version information is different from earlier version information.

9. The method according to claim 1, wherein the address family information of the first peer comprises primary address family information and subsequent address family information.

10. The method according to claim 4, wherein the second packet header comprises a flags field, and the flags field comprises at least one or more of following flag bits:
   a first flag bit, wherein the first flag bit is used to identify an address type of the first peer;
   a second flag bit, wherein the second flag bit is used to identify policy processing information of the first peer;
   a third flag bit, wherein the third flag bit is used to identify a quantity of bytes of an AS number of the first peer;
   a fourth flag bit, wherein the fourth flag bit is used to identify a type of routing information; and
   a fifth flag bit, wherein the fifth flag bit is used to identify integrity of the routing information.

11. The method according to claim 4, wherein the first packet header is a common packet header.

12. The method according to claim 4, wherein the second packet header is a per peer packet header per peer header.

13. The method according to claim 10, wherein the address type of the first peer comprises IPv4 or IPv6.

14. The method according to claim 1, wherein the type of the notification message comprises a route monitoring message, a peer up message, or a peer down message.

15. A method for monitoring a running state of a peer, wherein the method comprises:
   receiving and parsing, by a server, a notification message from a routing device, wherein the notification message carries address family information of a first peer and address information of the first peer; and
   storing, by the server, a running state of the first peer based on the address family information of the first peer, the address information of the first peer, and a type of the notification message.

16. An apparatus, comprising at least one processor; and
   one or more memories coupled to the at least one processor and configured to store instructions for execution by the at least one processor, the instructions instruct the at least one processor to cause a network node to:
   obtain address family information of a first peer and address information of the first peer; and
   send a notification message to a server, wherein the notification message carries the address family information of the first peer and the address information of the first peer, wherein the server stores a running state of the first peer based on the address family information of the first peer, the address information of the first peer, and a type of the notification message.

17. The apparatus according to claim 16, wherein the notification message comprises an extension header, and the address family information of the first peer is located in the extension header.

18. The apparatus according to claim 17, wherein the extension header is in a TLV format.

19. The apparatus according to claim 16, wherein the notification message further comprises a first packet header and a second packet header, and the first packet header is located in a header of the notification message.

20. An apparatus implemented by a server, comprising at least one processor; and
   one or more memories coupled to the at least one processor and configured to store instructions for execution by the at least one processor, the instructions instruct the at least one processor to cause the apparatus to:
   receive and parse, by the apparatus, a notification message from a routing device, wherein the notification message carries address family information of a first peer and address information of the first peer; and
   store, by the apparatus, a running state of the first peer based on the address family information of the first peer, the address information of the first peer, and a type of the notification message.

* * * * *